(12) United States Patent
Dang

(10) Patent No.: US 7,474,442 B2
(45) Date of Patent: Jan. 6, 2009

(54) HIGH PERFORMANCE COPROCESSOR FOR COLOR ERROR DIFFUSION HALFTONING

(75) Inventor: Philip P. Dang, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 687 days.

(21) Appl. No.: 10/951,331

(22) Filed: Sep. 24, 2004

(65) Prior Publication Data

US 2005/0094211 A1     May 5, 2005

Related U.S. Application Data

(60) Provisional application No. 60/517,364, filed on Nov. 5, 2003.

(51) Int. Cl.
*H04N 1/405* (2006.01)
(52) U.S. Cl. ..................... 358/3.03; 358/3.14
(58) Field of Classification Search ............ 358/1.9, 358/3.14, 3.03–3.05; 382/251–252, 237
See application file for complete search history.

(56) References Cited

U.S. PATENT DOCUMENTS

| 6,141,114 A * | 10/2000 | Mantell et al. ............. 358/1.9 |
| 6,977,757 B1 * | 12/2005 | Takahashi et al. .......... 358/3.05 |
| 2006/0082848 A1 * | 4/2006 | Takakura et al. ........... 358/534 |

* cited by examiner

*Primary Examiner*—Thomas D Lee
*Assistant Examiner*—Stephen M Brinich
(74) *Attorney, Agent, or Firm*—Lisa K. Jorgenson; William A. Munck

(57) ABSTRACT

An apparatus and method are provided to accelerate error diffusion for color halftoning for embedded applications. High performance is achieved by utilizing functional parallelism within the halftoning error diffusion process, including exploiting data parallelism in different color planes, reducing the number of memory accesses to the error buffer, accelerating the computation by using a parallel instruction set, and improving the throughput of the system by implementing pipelined architecture. A halftoning coprocessor architecture can implement the foregoing. The architecture can be optimized for high performance, low complexity and small footprint. The coprocessor can be incorporated into embedded systems to accelerate the performance of error diffusion halftoning therein.

17 Claims, 12 Drawing Sheets a. ACCUMULATED ERROR BUFFER b. A DETAILED VIEW OF ACCUMULATED ERROR BUFFER

HIGH PERFORMANCE COPROCESSOR FOR COLOR ERROR DIFFUSION HALFTONING

This application claims the priority under 35 U.S.C. §119 (e) of U.S. Provisional Application No. 60/517,364, filed on Nov. 5, 2003 and incorporated herein by reference.

FIELD OF THE INVENTION

This invention relates generally to digital image processing and, more particularly, to error diffusion halftoning in high performance printers and fast video display devices.

BACKGROUND OF THE INVENTION

Halftoning refers to the process of converting a continuous tone image, which is composed of gray levels, into a binary image. For color halftoning, the halftoning process is repeated in multiple color planes. Desktop printers, such as laser and ink-jet, rely on the digital halftoning technique to produce the visual illusion of continuous tone images. Besides that, color halftoning is also used in display technology. Other major products that employ halftoning technology are color monitors and flat-panel displays.

Halftoning has a long history. The earliest perfected halftoning technique was the analog halftoning, which was developed in the 1880s for printers. Before the analog halftoning, the predominant technology was the letterpress, which was incapable of printing intermediate tones. The letterpress could only print black and white images. At that time, the continuous-tone monochrome photographs were created by highly skill craftsmen. This process was slow and expensive. The halftoning technology was developed to help newspapers and magazines cheaply reproduce photographs in their publications.

In the early part of the 20$^{th}$ century, photolithography was the dominant halftoning technique. In the photolithography halftoning process, a negative of the continuous photograph is projected through a mesh screen onto a photosensitive plate. The mesh screen is usually a fine woven skill. Bright light passes through holes on fine woven skill to form a large round dot on the plate. Dim light would create a small dot. Light sensitive chemicals coating the plate form a small insoluble dot that varies in size according to the tones of the original photographs. This plate will be used for printing.

Later, the finer woven skill screen was replaced by two glass screens, which are coated by an opaque substance. Mesh of parallel and equidistant lines are scratched on each screen. Lines on the second screen are perpendicular to the lines on the first screen. By varying the number lines per inch, coarse or fine resolutions can be made.

The glass plate mesh was replaced by the processed film. The processed film is placed directly in contact with the unexposed lithography film. This approach allows the contact screen to have direct control of the dot structure, the screen frequency, the dot shape and the screen angle of the halftoning.

Almost a hundred years after the analog halftoning technique was developed, printing technology entered a new area: desktop publishing. The mechanical screening process developed since the nineteenth century was replaced by the digital imagesetter. In digital printers, the halftoning process is performed by the raster image processor (RIP) that converts each pixel in the original image from an intermediate tone directly into a binary dot. The binary output is generated based on the pixel-by-pixel comparison of the original image with an array of thresholds. If the pixel value is greater than the threshold value, it is turned on. Otherwise, it is turned off.

The RIP technology imitated the halftone patterns of the contact screens by employing clustered-dot ordered dithering where the threshold array was small. The array size is typically between 8×8 to 12×12. The threshold array was composed of consecutive thresholds arranged along a spiral path radiating outward from the array center. These arrangements would result in a single cluster of on pixels centered within each cell. It forms a regular grid that varied in size according to tone. These techniques were commonly referred as amplitude modulated (AM) halftoning. Like the contact screens, the result patterns of the AM halftoning vary in their screen frequency, dot shape, and screen angle.

In the 1970s, a new halftoning technique was presented. By maintaining the size of printed dots for all gray levels as individual pixels, the visual illusion of continuous pictures can be created by varying the spacing between the printed dots. This is the reason that the new method earned its name as frequency modulated (FM) halftoning.

In the AM halftoning method, the AM screening increases dot percentage in a pixel by growing the size of a dot according to a predetermined pattern. The amplitude of the dot pattern is modulated. The advantage to AM screening is that the human visual system is efficient in filtering out patterns, and therefore human eyes tend to easily ignore the dot structure of an AM screen.

The main problem with AM screening is that it is poor at recording fine detail and edges in an image. Also, when printing several colors, an image artifact known as moire can occur. Moire is the interference of two or more spatial signals, causing the formation of an interference pattern. The theoretical causes for moire patterns are the same as image formations in holography, except in holography, the interference patterns are desired. Moire patterns are not visually pleasant, and are avoided at all costs in the printing industry.

In the FM halftoning, the FM screening increases dot percentage in a pixel by somewhat randomly turning on another dot. The FM screens, which are completely random, are known as white noise masks. The spacing between dots is modulated. A blue noise mask contains a dot pattern in which dot-to-dot transitions within a pixel occur often. In other words the random dots are somehow correlated to exist in a given area of a pixel. Blue noise masks are useful because the human visual system has lower sensitivity to high frequency signals. This causes human eyes to be less capable of perceiving a blue noise mask. In general, all FM screens are good at retaining fine detail, but the final images made with FM screens tend to appear grainy. A major advantage to the FM screening is that it eliminates moiré.

The FM halftoning, however, also has a drawback. Like the AM halftoning schemes, the FM halftoning quantized each pixel individually independent from its neighbors. According to the dither array but with consecutive thresholds dispersed as much as possible. The problem associated with these early FM techniques is that the resulting halftone images suffered from a periodic structure that added an unnatural appearance.

In 1976,1 a revolutionary algorithm was developed to resolve this problem. This technique is known as error diffusion. In this technique, the quantization error, rather than being simply discarded, is used to modulate the value of the next incoming pixel gray level. The primary advantage of this technique is its ability to impart a large number of gray levels in the reproduced image. It performs especially well in the presence of very fine details in the image.

The implementation of error diffusion for color halftoning in embedded systems has some basic problems. First, the color error diffusion halftoning is a computationally intensive process. It requires a fast processing unit. Second, most error diffusion algorithms require large memory for storing diffusion coefficients and diffusion errors. Third, the error diffusion process also requires lot of memory accesses, which in general slows down the performance.

In the past, the halftoning processing has normally been performed by the central processing unit (CPU) of a personal computer (PC). Since most PCs have fast CPUs and large memory, there is no issue when the error diffusion algorithm is processed by the CPU of the PC.

Next generation printers, however, may work independently without a PC. In addition, in wireless communications, next generation mobile phones will be able to transmit images and videos. These mobile phones need high performance processors to process data. Printers and mobile devices, however, have limited resources of power, CPU and memory. Software solutions, such as DSPs, can provide a flexible solution but cannot meet real time constraints.

There is therefore a need to develop an efficient embedded architecture to implement color error diffusion halftoning for stand-alone systems.

SUMMARY OF THE INVENTION

Exemplary embodiments of the invention provide high performance, low complexity halftoning coprocessors which can be embedded in stand-alone systems to support high speed printing applications or to assist the main processor in computing error diffusion and displaying video frames in real time. Error diffusion is accelerated, and the halftoning coprocessor can speed up the halftoning process.

BRIEF DESCRIPTION OF THE DRAWINGS

The invention may be understood by reference to the accompanying drawings of which.

DETAILED DESCRIPTION

Figure 1:
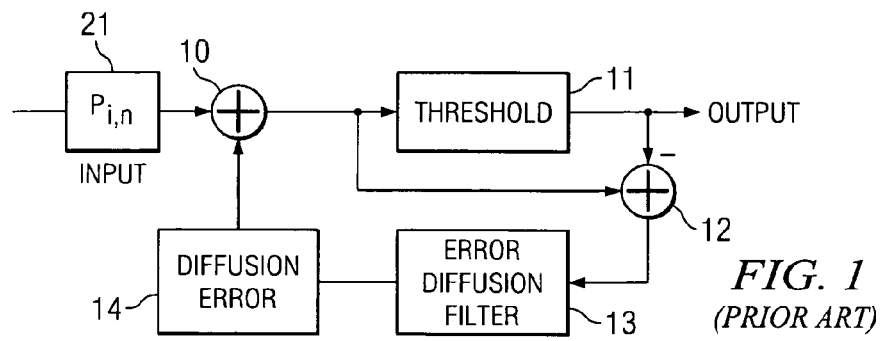
FIG. 1 shows the block diagram of a prior art error diffusion halftoning algorithm.

Exemplary embodiments of the invention exploit both data parallelism and functional parallelism in error diffusion halftoning processes. The use of both data parallelism and functional parallelism can offer a significant speed-up factor. The data parallelism exploits the fact that the process to calculate error diffusion and halftoning in different color planes is similar or identical. These computations, therefore, can be performed in parallel using single instruction multiple data (SIMD). In order to process color planes in parallel, pixels in four color planes are interleaved. In some embodiments a set of 64-bit SIMD instructions specifies and controls performance of appropriate tasks in the halftoning error diffusion process.

For the functional parallelism, various embodiments use one or more of three different techniques, namely parallelism in the instruction level, parallelism in the procedure level, and parallelism in the loop level. At the instruction level, analysis of data dependency in error diffusion halftoning indicates that several of the constituent operations can be processed concurrently. This observation indicates that several processing units can carry out these concurrent tasks.

At the procedure level, instead of considering the error diffusion halftoning process as a single process (as in the traditional approach), exemplary embodiments of the invention partition the error diffusion halftoning into two procedures. The first procedure (and corresponding data processing unit) calculates the digital halftoning output, and the second procedure (and corresponding data processing unit) computes the error diffusion into neighbor pixels. In some embodiments, the data path in each data processing unit is designed in a pipelined fashion, and each unit takes 4 clock cycles to finish its computation.

At the loop level, according to some embodiments, the operations of the aforementioned two procedures are synchronized. When the error diffusion unit calculates error diffusion for color pixel $p_{i,n}$, the halftoning unit concurrently calculates the halftone output for pixel $p_{i+1,n}$.

Another way to accelerate the color error diffusion halftoning process is to reduce the number of memory accesses. In the traditional approach, the error diffusion unit accesses an error buffer six times (3 loads and 3 stores) per pixel to update the accumulated errors. Exemplary embodiments of the invention provide two special registers to store the intermediate diffusion errors. For any given pixel, only the accumulated error for that pixel is stored in the error buffer. This reduces the number of memory accesses from six times per pixel to only one time per pixel.

In order to reduce the complexity of the halftoning coprocessor, exemplary embodiments implement a Floyd-Steinberg filter. This approach eliminates the need of using look-up tables, and shift-add units can be used to perform the filtering process. In this manner, multipliers, which require a large footprint and create long latency, can be avoided.

Some embodiments of the invention provide for a programmable threshold in the halftoning process. Different applications may implement different thresholding values to achieve better visual illusion, and the halftoning coprocessor can accept programmable threshold values. These values can be different for each color plane.

By combining the aforementioned parallelism and reduction in memory access, exemplary color halftoning coprocessor embodiments of the invention can provide significant gains in throughput. Some embodiments can generate one color halftoning output per four clock cycles. Other embodiments may be optimized for higher performance, smaller footprint, and lower power consumption. These features are well suited for embedded applications.

FIG. 1 shows a conventional error diffusion halftoning circuit. Input pixel 21 is added with the diffusion error 14 at the first adder 10. The output generated from this adder is fed into a threshold unit 11 to generate the output pixel. At the second adder 12, the quantization error is calculated by subtracting the output pixel from the output of the first adder. This quantization error is applied to the error diffusion filter 13 to calculate the error diffusion for other pixels.

Figure 2:
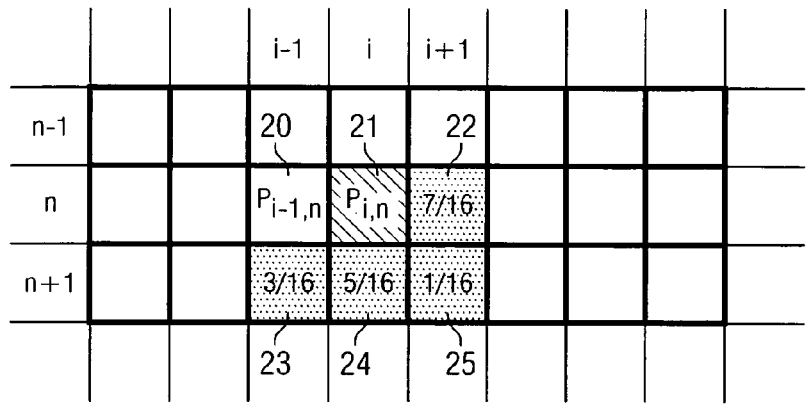
FIG. 2 illustrates the distribution coefficients as in the prior art Floyd-Steinberg algorithm.

FIG. 2 shows four coefficients 22, 23, 24, 25 of the Floyd-Steinberg's filters according to the prior art. The quantization error of the input pixel $P_{i,n}$ 21 will be distributed to the four neighbor pixels at locations (i+1,n), (i−1,n+1), (i,n+1), and (i+1,n+1).

Figure 3:
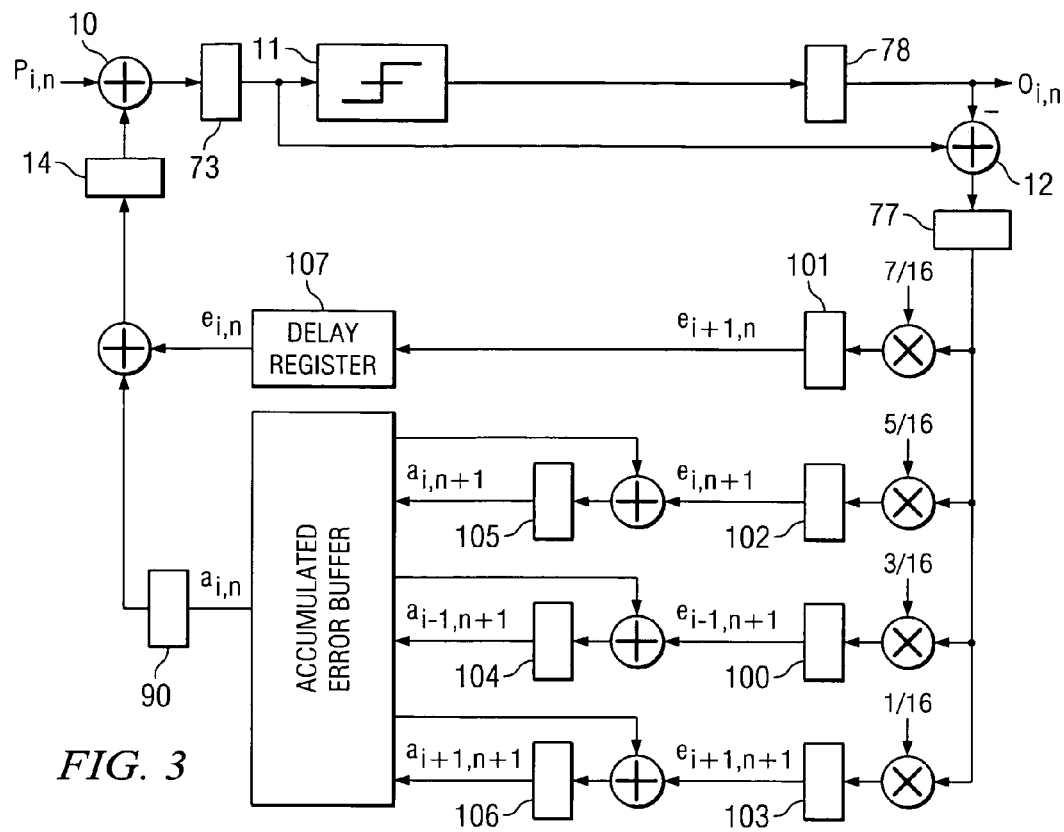
FIG. 3 shows an exemplary data path for error diffusion halftoning according to the invention.

FIG. 3 illustrates an exemplary data path according to the invention for using the Floyd-Steinberg error diffusion algorithm. The top part of FIG. 3 is similar to FIG. 1. The quantization error 77, associated with pixel $P_{i,n}$ is created by the second adder 12, and is multiplied by 7/16 to generate error 101, which is diffused into pixel $P_{i+1,n}$. Likewise, the quantization error 77 is multiplied by 5/16, 3/16, and 1/16 to generate diffusion errors 102, 100, and 103, respectively. These three diffusion errors are added with previous errors already stored in the accumulated error buffer to generate three new diffusion errors 105, 104, and 106. These latter diffusion errors are stored into the accumulated error buffer and will be diffused to pixels $P_{i,n+1}$, $P_{i-1,n+1}$, and $P_{i+1,n+1}$, respectively.

Figure 4:
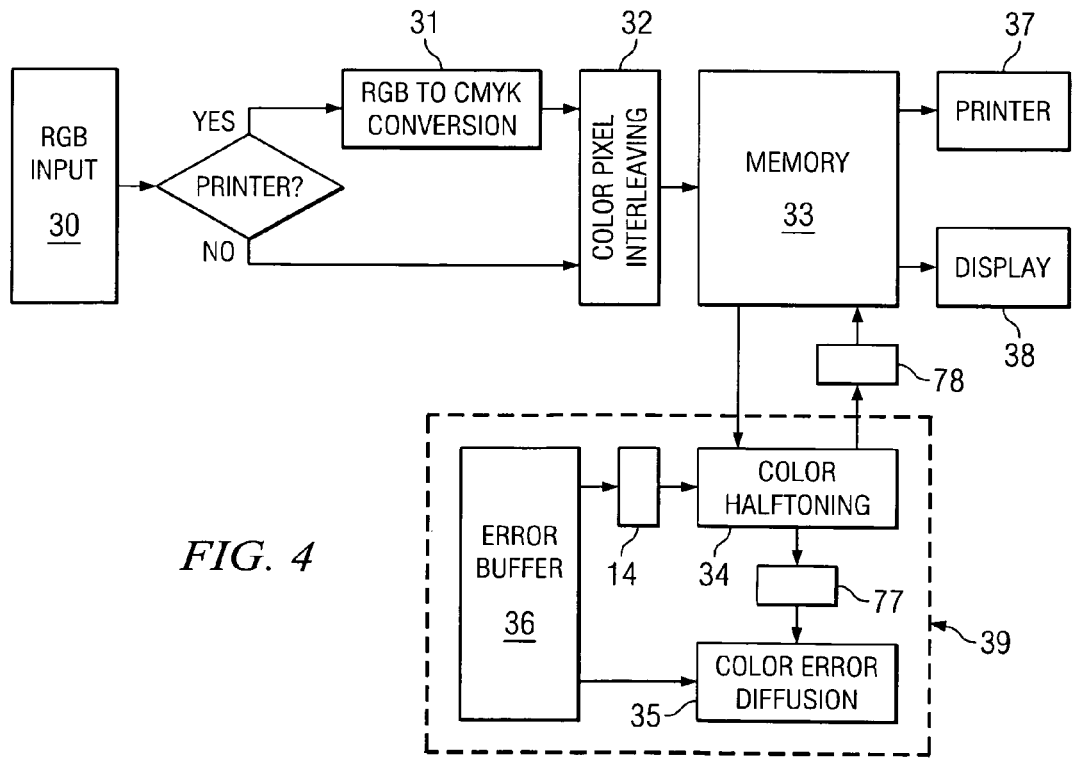
FIG. 4 is a top-level depiction of an exemplary error diffusion halftoning engine architecture according to the invention.
Figure 13:
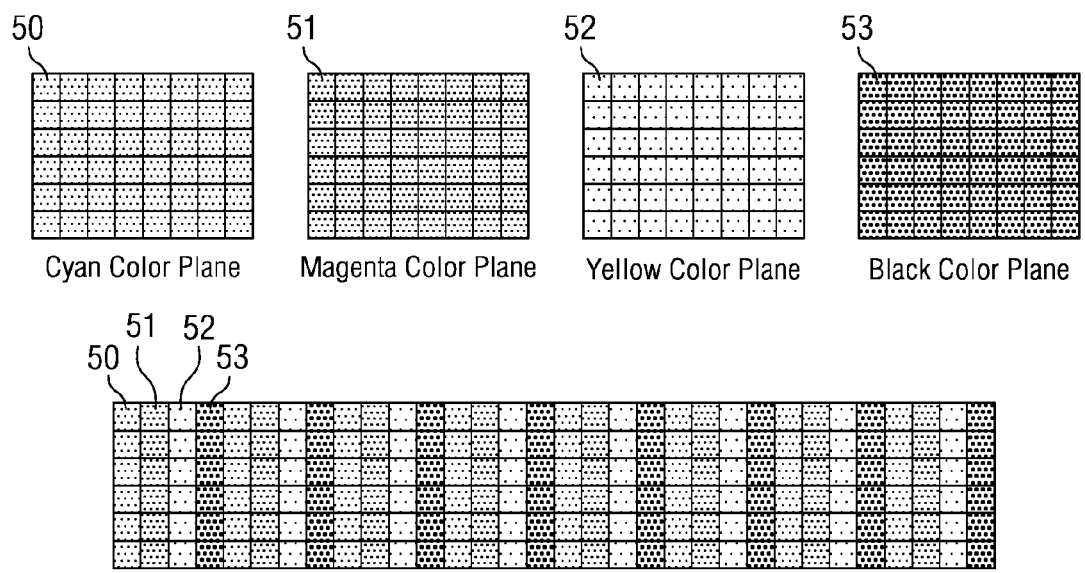
FIG. 13 illustrates an example of pixel interleaving which can be performed by the interleaver of FIG. 4.
Figure 14:
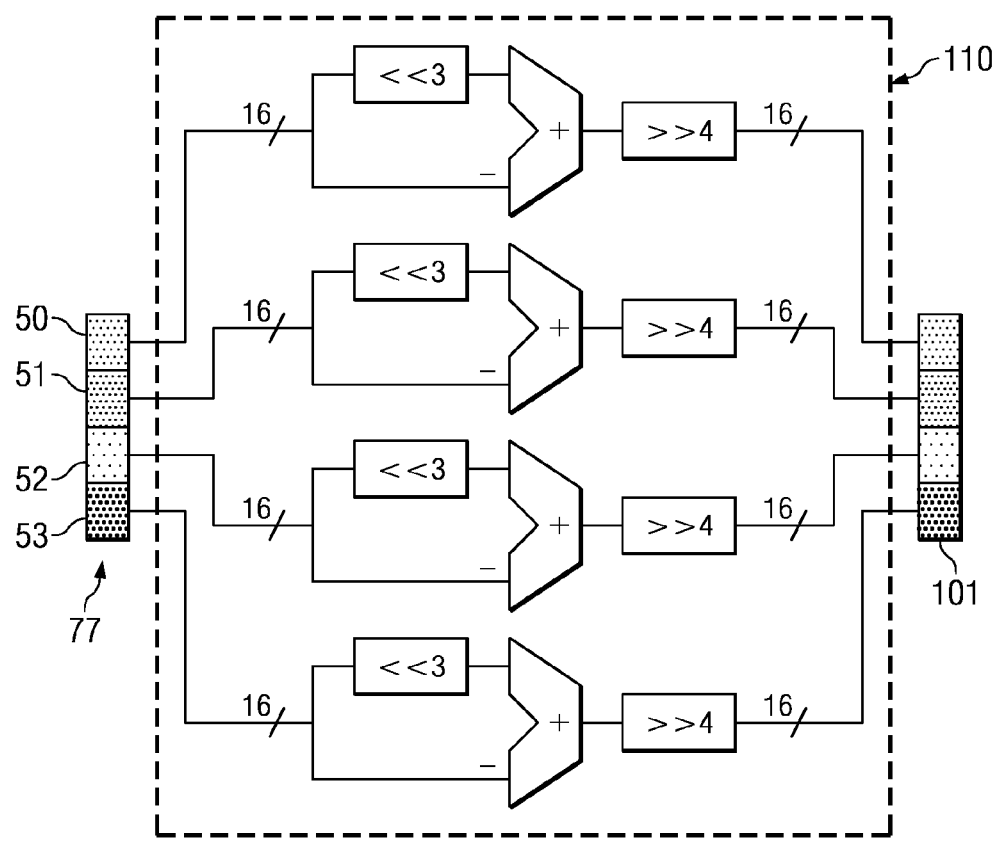
FIG. 14 diagrammatically illustrates an exemplary embodiment of a filter unit of FIGS. 9 and 10.
Figure 15:
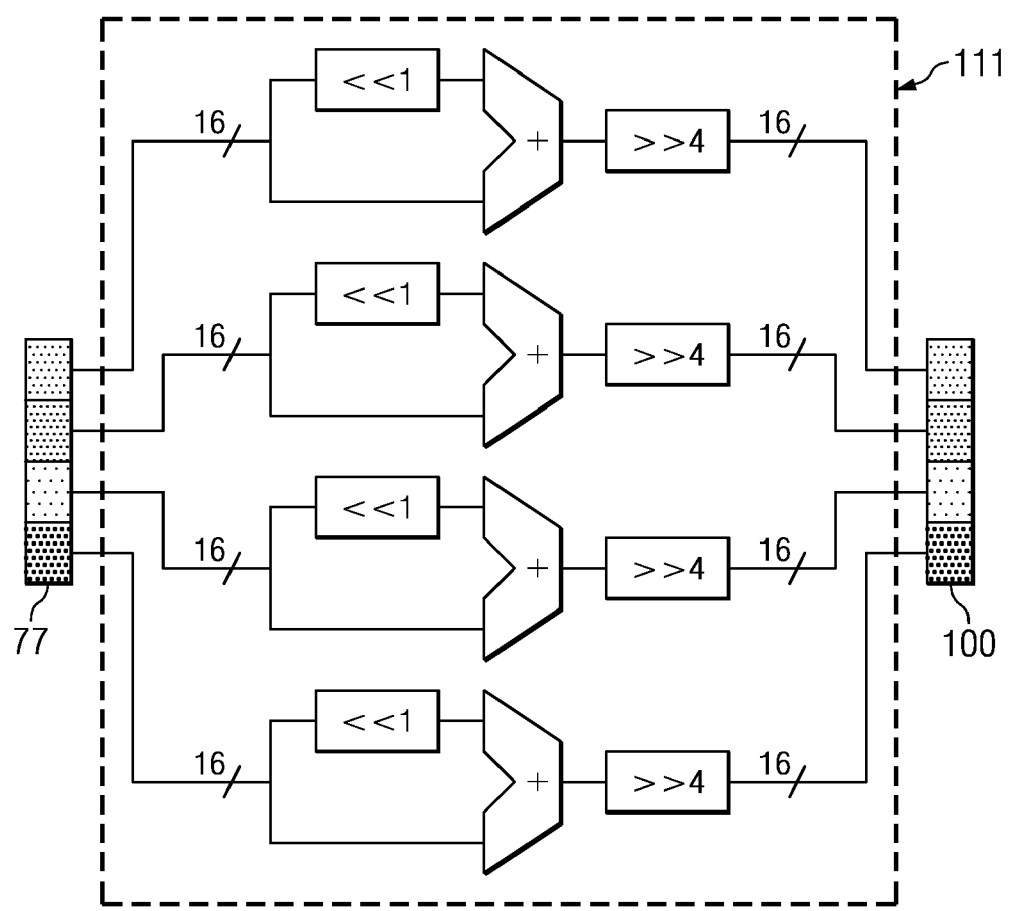
FIG. 15 diagrammatically illustrates an exemplary embodiment of a filter unit of FIGS. 9 and 10.
Figure 16:
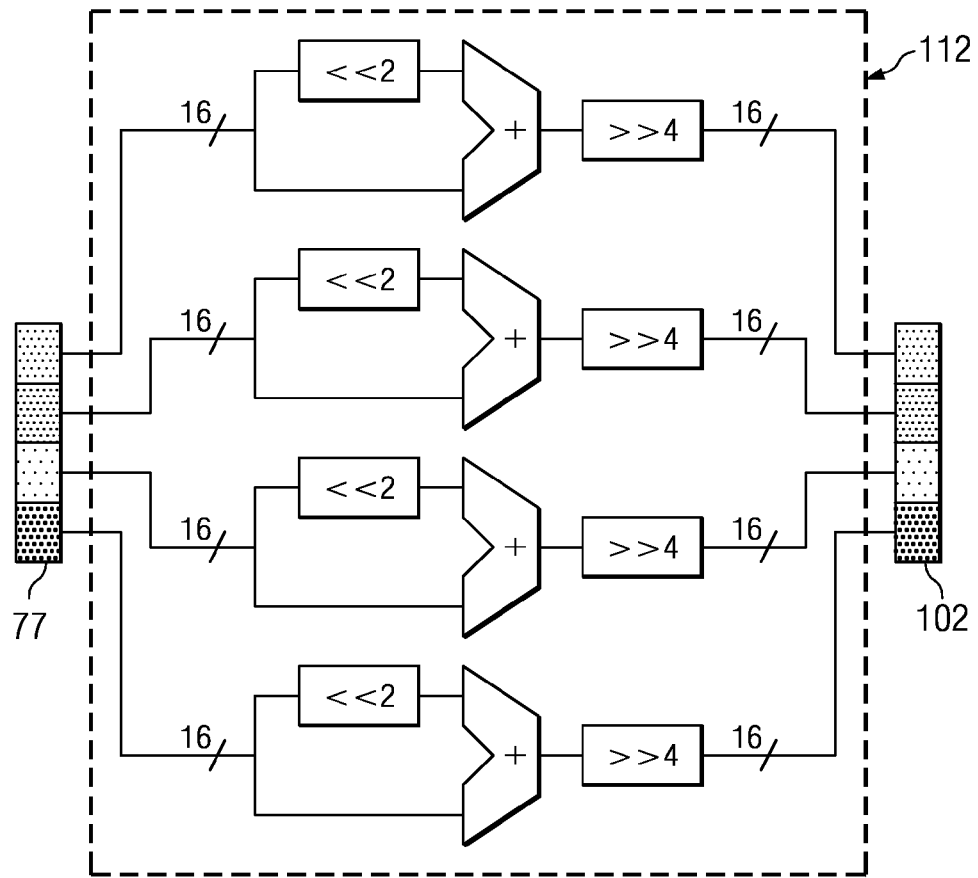
FIG. 16 diagrammatically illustrates an exemplary embodiment of a filter unit of FIGS. 9 and 10.
Figure 17:
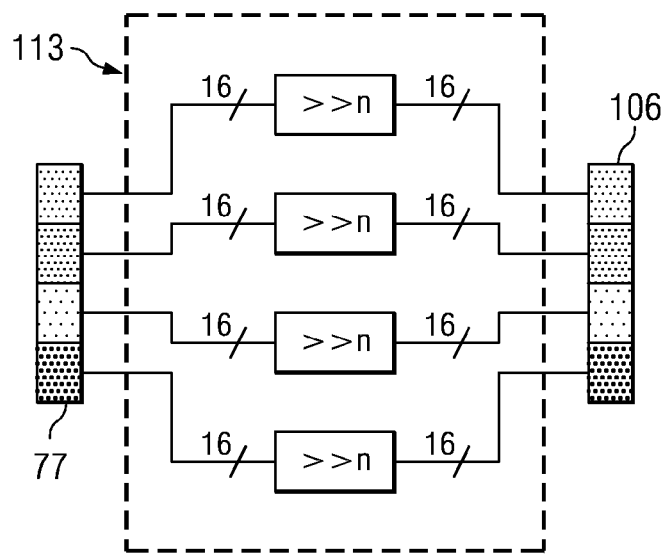
FIG. 17 diagrammatically illustrates an exemplary embodiment of a filter unit of FIGS. 9 and 10.

FIG. 4 is a top-level depiction of an exemplary system including an error diffusion color halftoning engine architecture 39 according to the invention. For display application 38, the RGB inputs go directly to the interleaving unit 32. For printer application 37, input pixels in RGB format 30 are converted into the CMYK format 31. The color pixels at different color planes are interleaved at 32 and stored in the memory 33. (The interleaving of four color planes 50-53 is illustrated in the example of FIG. 13.) Color pixels are loaded into the color halftoning circuit 34. The color halftoning engine 34 will calculate the halftoning output 78, which is stored back in the memory. The color halftoning engine 34 also calculates the quantization error 77, which is fed into the color error diffusion engine 35 to calculate diffusion errors 104, 105, and 106. These errors are stored in the accumulated error buffer 36 and will be diffused into future pixels.

Figure 5:
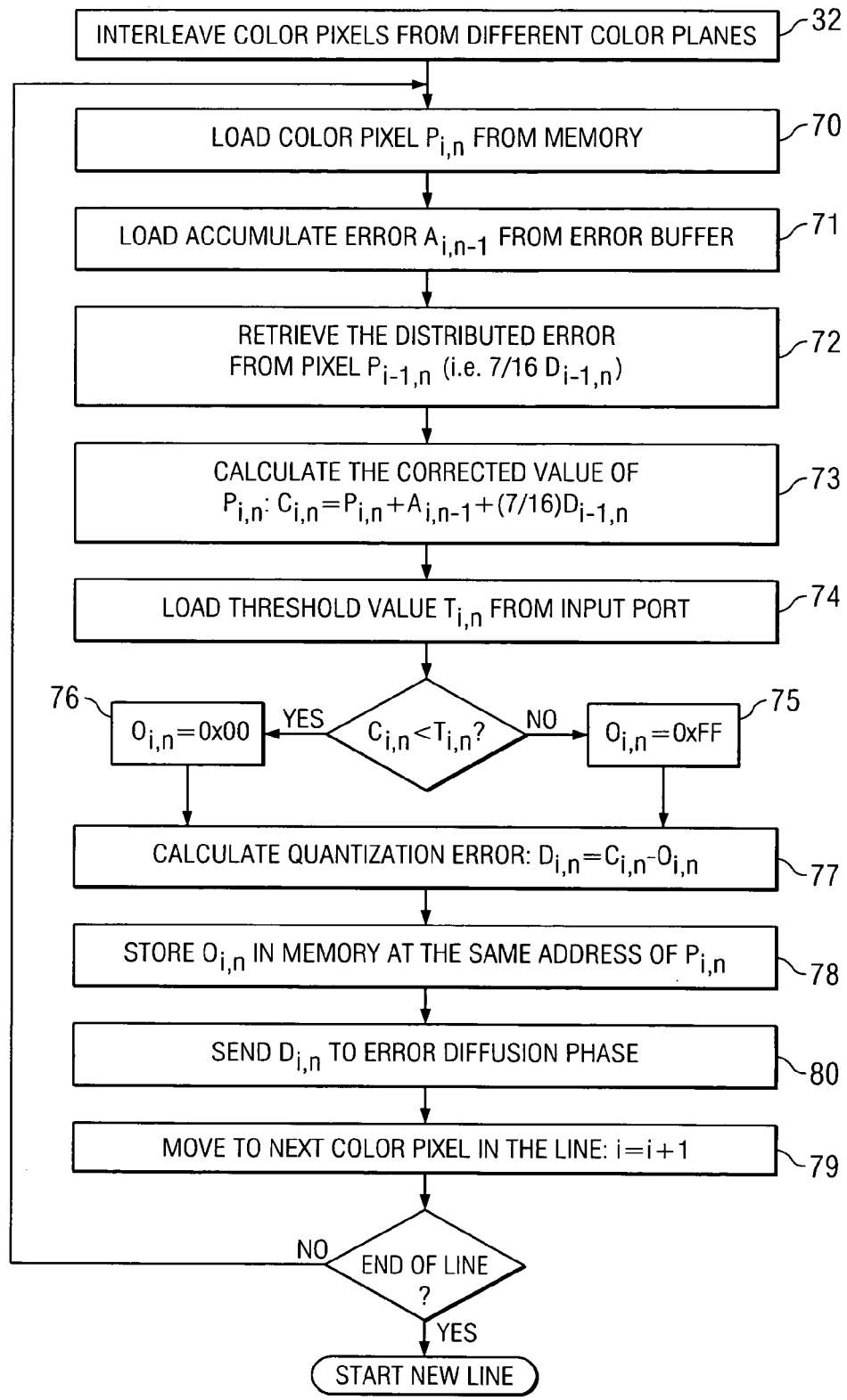
FIG. 5 shows a color halftoning procedure used by the invention.

FIG. 5 shows the flowchart of a color halftoning procedure used by exemplary embodiments of the invention. The color halftoning engine 34 (see also FIG. 4) loads 70 the color pixels from the memory. In addition, the color halftoning engine 34 also loads 71 the accumulated diffusion errors from the error buffer and retrieves 72 diffusion errors from the previous pixel. The corrected value $C_{i,n}$ of the input pixel $P_{i,n}$ is calculated 73. At the threshold unit 11 (see also FIG. 1), new threshold values $T_{i,n}$ are loaded 74 and the value $C_{i,n}$ is compared with the threshold $T_{i,n}$ to determine the output $O_{i,n}$. If $C_{i,n}$ is smaller $T_{i,n}$ then $O_{i,n}$ is 0×00. On the other hand, if $C_{i,n}$ is greater $T_{i,n}$ then $O_{i,n}$ is 0×FF. The quantization error $D_{i,n}$ 77 is the difference between the correct value $C_{i,n}$ and the output $O_{i,n}$. The output $O_{i,n}$ is stored 78 in the memory. The quantization error $D_{i,n}$ is sent to the error diffusion engine at 80. After indexing to the next pixel at 81, the color halftoning engine 34 loads the next color pixel at 70 and repeats the process until the computation for the current image line is completed.

Figure 6:
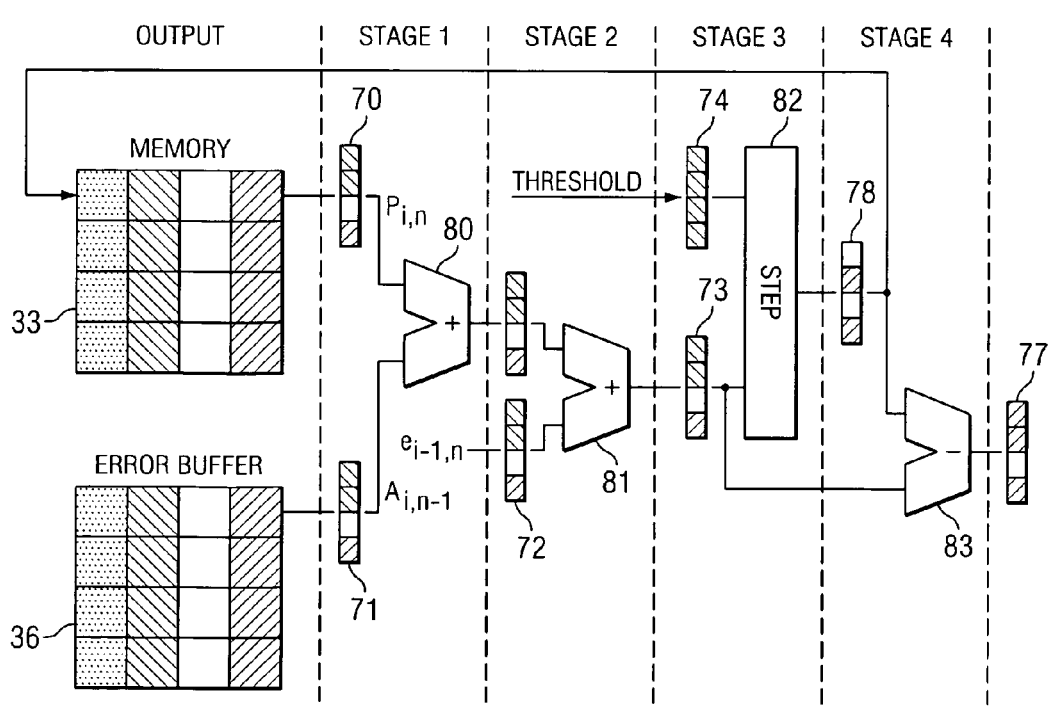
FIG. 6 diagrammatically illustrates a pipelined architecture for color halftoning in accordance with exemplary embodiments of the invention.

FIG. 6 diagrammatically illustrates exemplary embodiments of a pipelined architecture for a color halftoning engine according to the invention. The pipelined architecture of the color halftoning engine includes four stages. Stage 1 includes a parallel adder 80, which is able to calculate four 16-bit by 16-bit additions per single clock cycle. This parallel adder is used to perform 16 by 16 addition operations for each of four color planes (e.g., CMYK) in parallel. Similarly, stage 2 also includes a parallel adder 81, which calculates the value of $C_{i,n}$ for each of four color planes. The Step unit 82 in stage 3 performs the threshold operation. It compares the threshold values with $C_{i,n}$ and generates the halftone outputs. Stage 4 is equipped with a parallel subtracter 83, which is used to calculate the quantization errors $D_{i,n}$. In some embodiments, each stage completes its computation within a single clock cycle. Hence, the input-to-output latency of the color halftoning engine would be four clock cycles. In some embodiments, all four stages are clocked together for simultaneous operations. In other embodiments, the four stages are clocked in sequence for sequential operation, for example, stage 1, then stage 2, then stage 3, then stage 4.

Figure 7A:
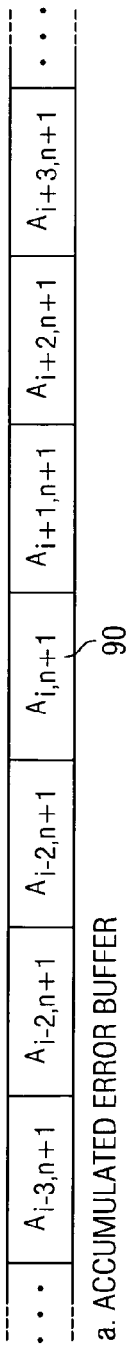
FIG. 7a and FIG. 7b illustrate the calculation and storage of accumulated errors.
Figure 7B:
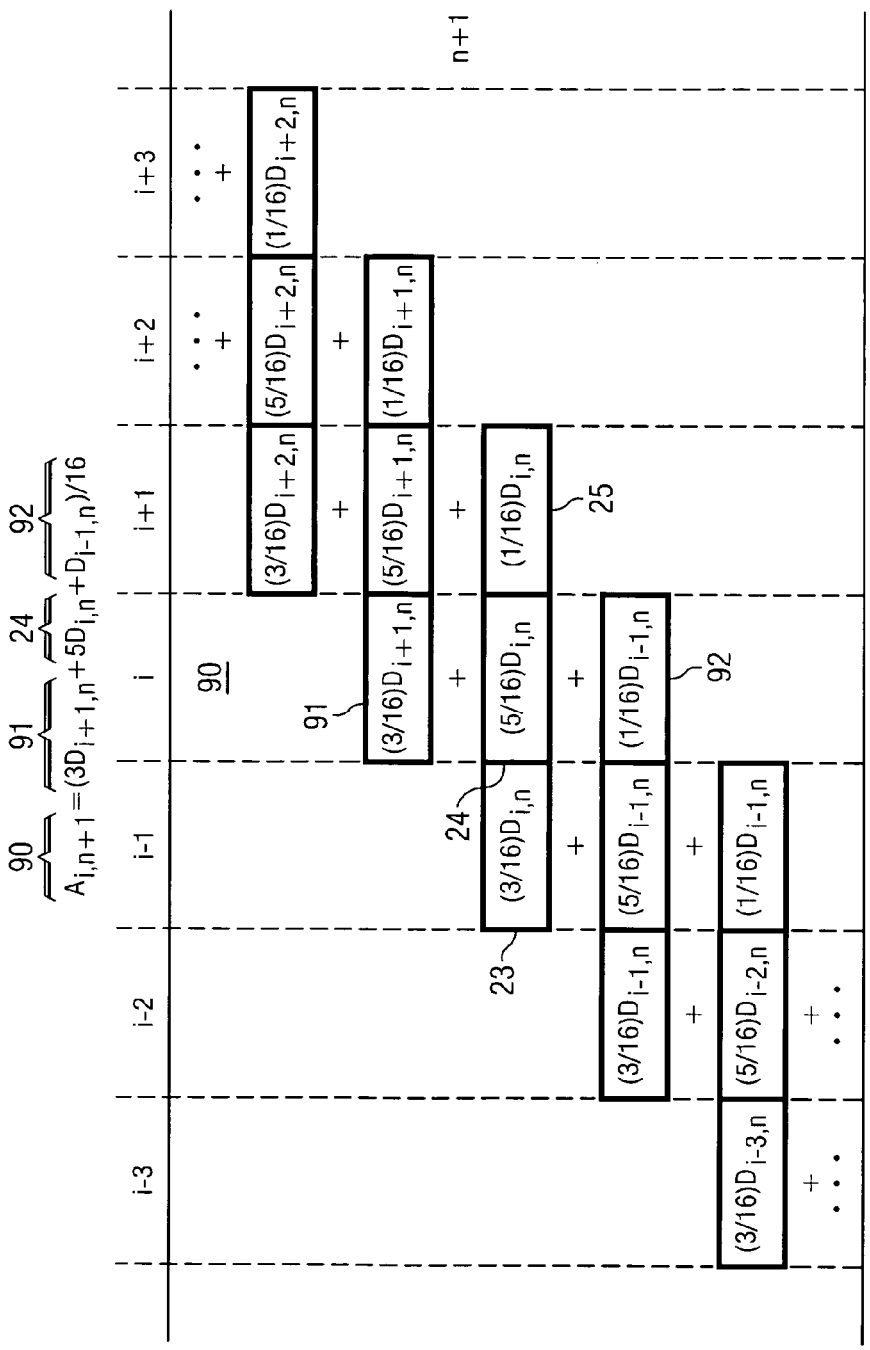

FIG. 7a explains how the accumulated diffusion error $A_{i,n+1}$ 90 is calculated. It is the weighted sum of the quantization errors 91, 24, and 92. FIG. 7b illustrates the process by which diffusion errors are accumulated in the memory buffer. As shown in FIG. 7a,1 the accumulated diffusion error $A_{i,n+1}$ 90 is the weighted sum of the quantization errors $D_{i-1,n}$, $D_{i,n}$, and $D_{i+1,n}$. Its value is computed in three steps. First, 1/16 of $D_{i-1,n}$ 92 is stored in the memory buffer location corresponding to $A_{i,n+1}$. The old value at this memory buffer location is overwritten. Second, 5/16 of $D_{i,n}$ 24 is added with the current value in the memory buffer location corresponding to $A_{i,n+1}$. The new result is stored back into the same memory buffer location corresponding to $A_{i,n+1}$. Third, 3/16 of $D_{i+1,n}$ 91 is added with the current value in the memory buffer location corresponding to $A_{i,n+1}$ and the result is then stored back in the same memory buffer location corresponding to $A_{i,n+1}$. This latter result is for use in a future calculation.

Figure 8:
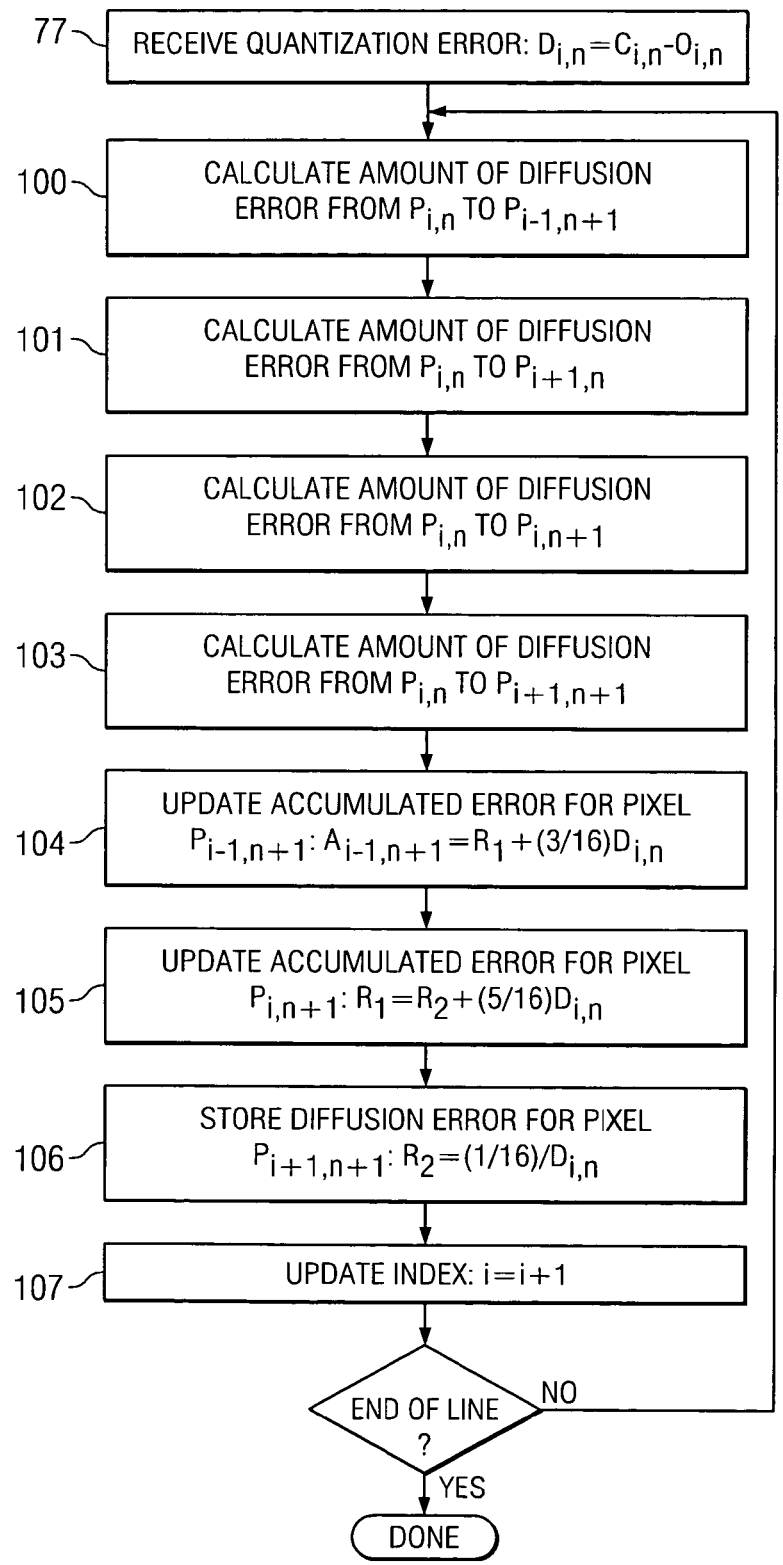
FIG. 8 illustrates an error diffusion procedure in accordance with exemplary embodiments of the invention.

FIG. 8 diagrammatically illustrates exemplary operations of an error diffusion procedure according to the invention. The error diffusion engine 35 (see also FIG. 4) receives the quantization error 77 from the color halftoning engine 34. The error diffusion engine 35 calculates the errors from pixel $P_{i,n}$ to be diffused to four pixels $P_{i+1,n}$ 101, $P_{i-1,n+1}$ 100, $P_{i,n+1}$ 102 and $P_{i+1,n+1}$ 103. After these calculations, the error diffusion engine updates 104 the accumulated error for pixel $P_{i-1,n+1}$, updates 105 the accumulated error for pixel $P_{i,n+1}$, and stores 106 the diffusion error for pixel $P_{i+1,n+1}$. After indexing to the next pixel at 107, the error diffusion engine 35 receives the next quantization error at 77 and repeats the process until the computations for the current image line are completed.

Figure 9:
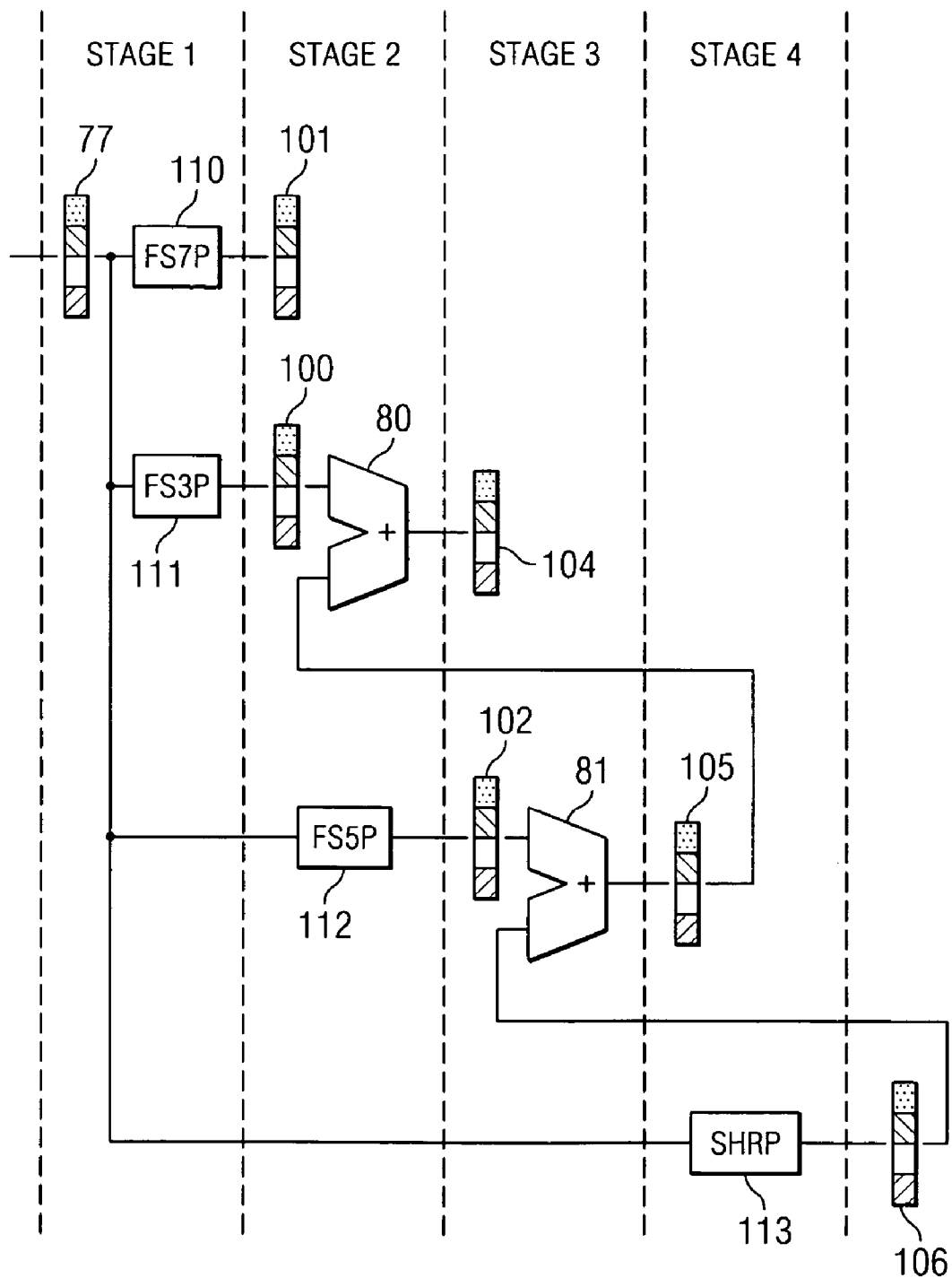
FIG. 9 diagrammatically illustrates a pipelined architecture for error diffusion in accordance with exemplary embodiments of the invention.

FIG. 9 diagrammatically illustrates exemplary embodiments of a pipelined architecture for an error diffusion engine according to the invention. The pipelined architecture of the error diffusion engine includes four stages which can synchronize operationally with the four stages of the color halftoning engine of FIG. 6. In some embodiments, some computation units are shared by the error diffusion engine and the color halftoning engine to reduce the hardware cost. Stage 1 of the error diffusion engine includes two filter units 110 and 111 which are used to calculate the respective Floyd-Steinberg (FS) diffusion errors for pixels $P_{i+1,n}$ and $P_{i-1,n+1}$. In some embodiments, stage 2 shares the parallel adder 80 from the stage 1 of the FIG. 6 color halftoning engine. This adder is used to calculate the accumulated error for pixel $P_{i-1,n+1}$. Stage 2 also has a filter unit 112, which calculates the FS diffusion error for pixel $P_{i,n+1}$. In some embodiments, stage 3 shares the parallel adder 81 from stage 2 of the FIG. 6 color halftoning engine. This adder calculates a diffusion error component of the accumulated error for pixel $P_{i,n+1}$. Stage 4 of the error diffusion engine has a parallel shift left unit 113 to calculate the FS diffusion error for pixel $P_{i+1,n+1}$. In some embodiments, each stage completes its computation within a single clock cycle. Hence, the input-to-output latency of the error diffusion engine would be four clock cycles. In some embodiments, all four stages are clocked together for simultaneous operations. In other embodiments, the four stages are clocked in sequence for sequential operation, for example, stage 1, then stage 2, then stage 3, then stage 4.

FIGS. 14-17 respectively illustrate exemplary embodiments of the filter units 110-113 of FIG. 9.

Figure 10:
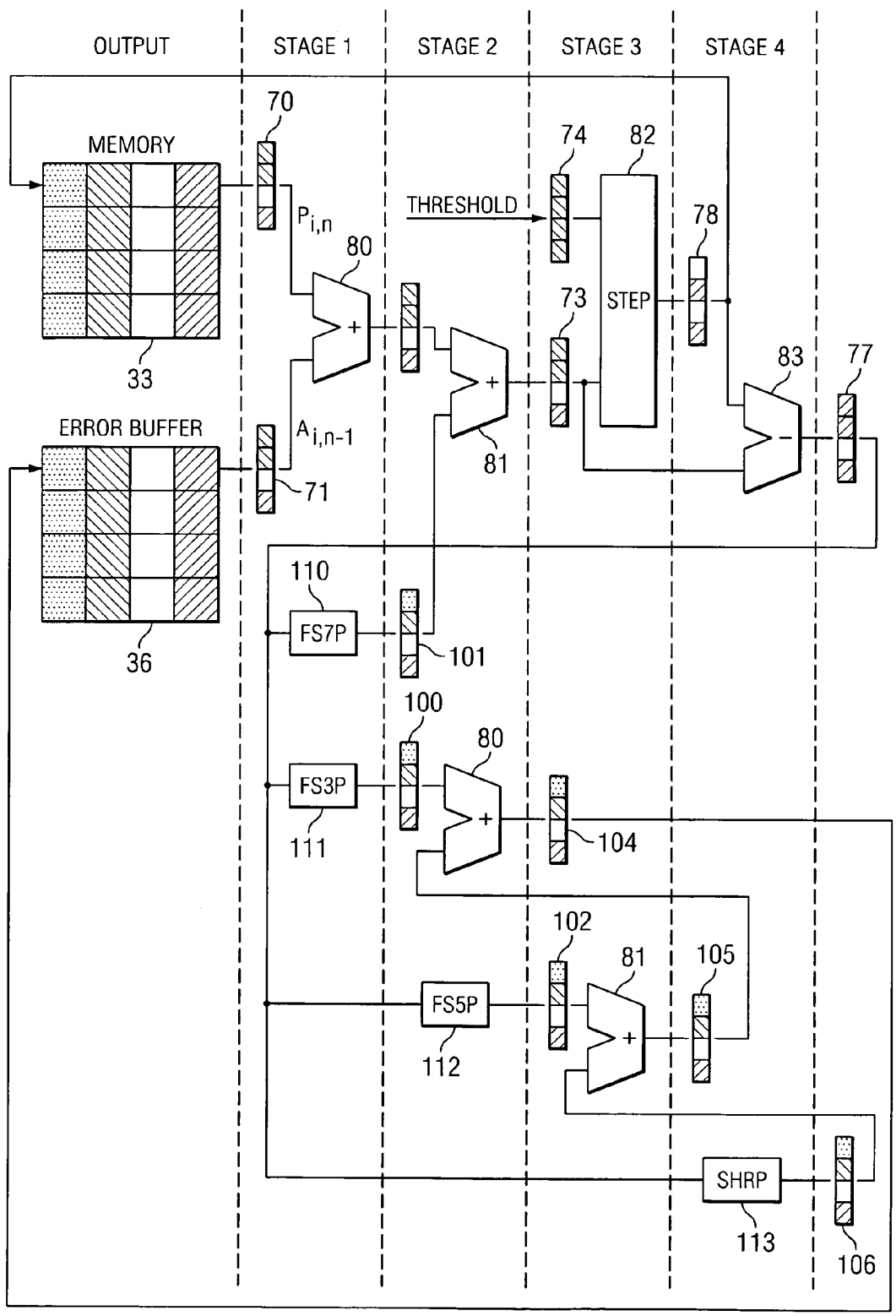
FIG. 10 diagrammatically illustrates the pipelined architectures of FIGS. 6 and 9 as combined according to exemplary embodiments of the invention.

FIG. 10 diagrammatically illustrates exemplary embodiments of a pipelined architecture of a color error diffusion halftoning coprocessor, which combines the architectures from FIG. 6 and FIG. 9. The color halftoning engine of FIG. 6 is on the top and the error diffusion engine of FIG. 9 is on the bottom. Three parallelism techniques, namely parallelism in the instruction level, parallelism in the procedure level, and parallelism in the loop level, are utilized in FIG. 10 to enhance the performance of the coprocessor. For the instruction level parallelism, three instructions can run concurrently in both stage 1 (one add instruction and two filter instructions) and stage 2 (two add instructions and one filter instruction). In stages 3 and 4, two instructions can execute in parallel (threshold and add instructions in stage 3; add and filter instructions in stage 4).

For the procedure level parallelism, the color error diffusion halftoning algorithm is partitioned into halftoning and error diffusion procedures. Each procedure is mapped into a different engine with four cycles latency. Both procedures can operate in parallel to speed up the performance.

For the loop level parallelism, after the color halftoning engine finishes the first loop (first halftoning operation), the quantization error 77 is fed into stage 1 of the error diffusion engine so stage 1 can calculate diffusion errors 100 and 101 right away. During that time, stage 1 of the color halftoning engine performs part of the calculation of $C_{i,n}$.

All execution units 80-83 and 110-113 in the example of FIG. 10 are capable of performing 16-bit operations on each of four color planes in parallel. This can be seen with reference to the FIG. 13 interleaving and the example execution unit of FIG. 14.

Returning to FIG. 10, the diffusion error output 101 from stage 1 of the error diffusion engine is input to stage 2 of the color halftoning engine. Hence, both engines can operate concurrently without further delay. This partitioning of the calculation of $C_{i,n}$ between stages 1 and 2 of the halftoning engine also facilitates the aforementioned re-use of adder 80. While the error diffusion engine calculates diffusion errors based on the halftoning of pixel $P_{i,n}$, the color halftoning engine is simultaneously calculating the halftone output for pixel $P_{i+1,n}$. To further speed up the performance of the system, two registers 105 and 106 store diffusion errors locally within the error diffusion data path. This reduces the number of error buffer memory accesses, and thus enhances performance. In some embodiments, the registers 105 and 106 are implemented as 2-deep and 3-deep FIFOs, respectively, in order to provide the time window necessary for the accumulated error calculation performed at 111, 112, 113, 80 and 81 in the error diffusion engine (see also FIGS. 7a and 7b). Referring also to FIG. 8, $R_1$ refers to contents of FIFO 105, and $R_2$ refers to contents of FIFO 106.

As indicated above, to reduce the hardware cost in some embodiments, the halftoning and error diffusion engines can share similar execution units. For instance, stage 2 of the error diffusion engine can use the adder 80 of stage 1 of the color halftoning engine. Likewise, stage 3 of the error diffusion engine can use the adder 81 of stage 2 of the color halftoning engine. With this approach, the hardware cost of the system is reduced. The coprocessor can thus be realized in hardware with three parallel adders/subtracters instead of five parallel adders. Adders 80 and 81 are each shown twice for clarity in FIG. 10, but it should be understood that only one instance of each adder is needed in the shared embodiments.

In the above-described shared embodiments, corresponding stages of each engine are clocked together in sequential fashion, e.g. stages 1 of both engines, then stages 2 of both engines, etc. However, embodiments that utilize all five adders can clock all stages of both engines simultaneously to achieve fully-pipelined concurrency of operations, or can clock corresponding pairs of stages together in sequential fashion as described above.

Figure 11:
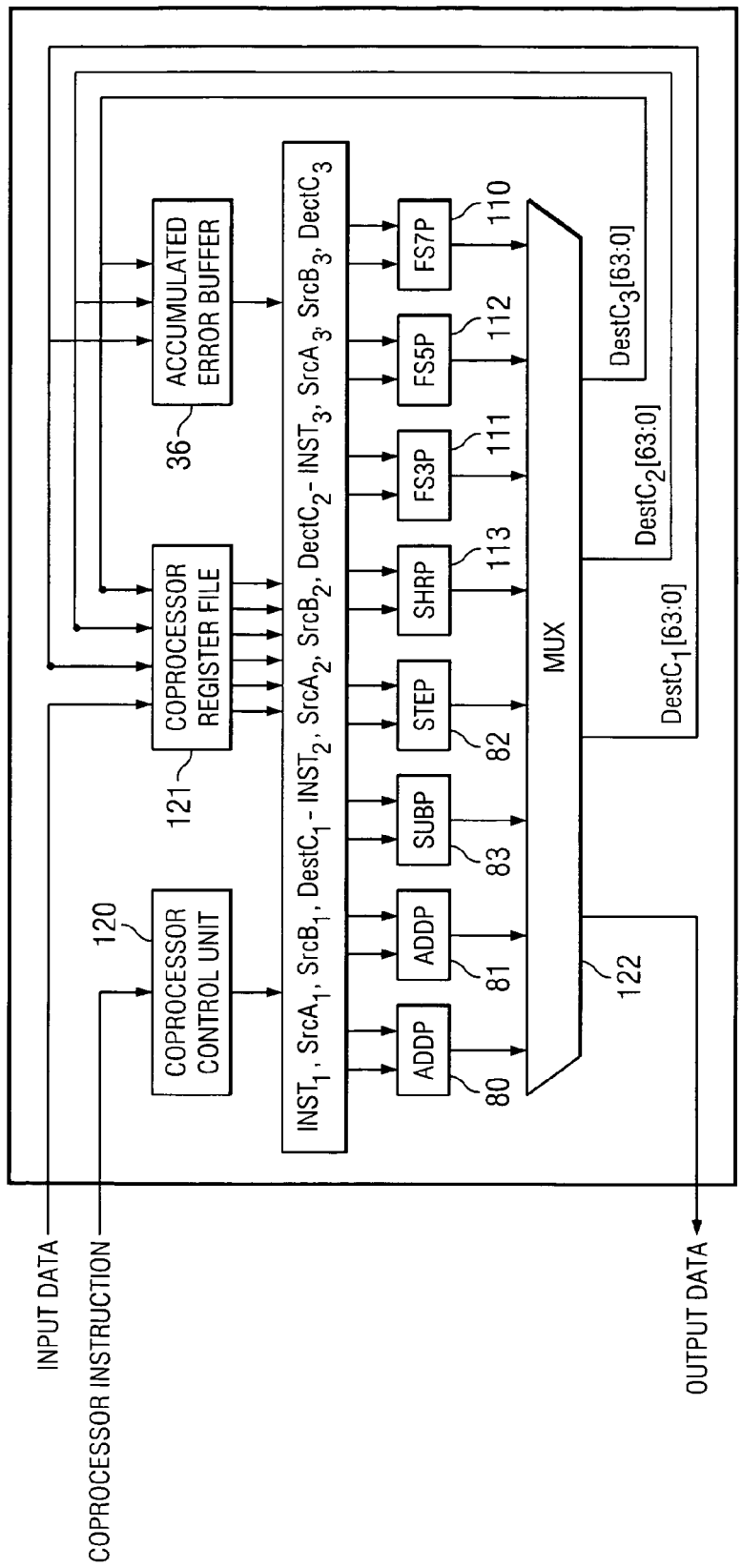
FIG. 11 displays a coprocessor architecture which implements the combination of FIG. 10 to perform color error diffusion halftoning in accordance with exemplary embodiments of the invention.

FIG. 11 diagrammatically illustrates exemplary embodiments of a coprocessor architecture for color error diffusion halftoning according to the invention. The coprocessor receives input data from an external memory (not explicitly shown) and coprocessor instructions from a main processor (not explicitly shown). The halftoning outputs are stored back in external memory. The coprocessor includes a control unit 120 for decoding the coprocessor instructions, a register file 121 for implementing registers 70, 71, 73, 74, 77, 78, 100, 101, 102, 104, 105, 106 and 700 of FIG. 10, the accumulated error buffer 36, the execution units 80, 81, 82, 83, 113, 111, 112, 110, and a multiplexer 122. In some embodiments, the control unit 120 is a four stage finite state machine, which controls the operations of the color error diffusion halftoning coprocessor. The register file 121 stores the intermediate results. The accumulated error buffer keeps the accumulated errors for the next line. Eight (for shared embodiments, otherwise ten) execution units perform the specific tasks of the error diffusion halftoning process. The multiplexer 122 is controlled by the control unit 120 to select the operations and outputs for each stage. Controller 120 also controls routing of data to/from the register file 121 and error buffer 36 from/to the execution units.

In some embodiments, the halftoning coprocessor of FIG. 11 is designed to work with the ARM946E-S processor, modeled in C/C++, and integrated to work with the ARM Development Tool Set ADS 1.2.

Figure 12:
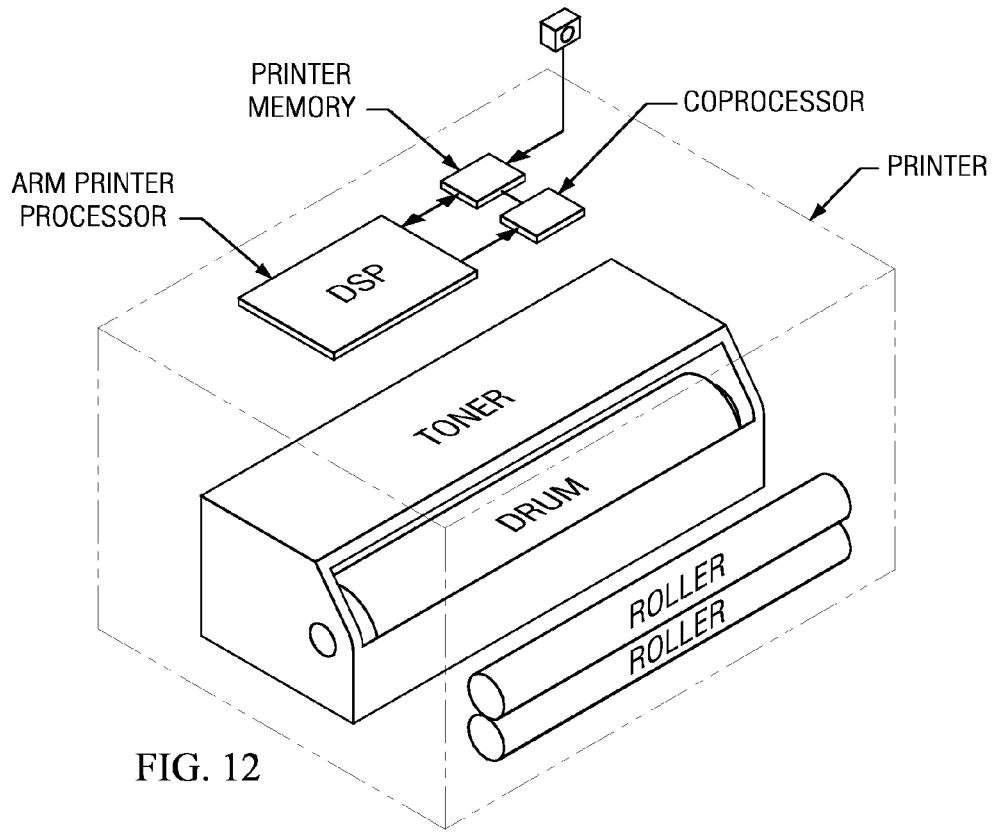
FIG. 12 illustrates an example of a stand-alone printer according to the invention.

In some embodiments of the invention, the coprocessor can be embedded together with the ARM processor in a printer. The coprocessor provides assistance in error diffusion halftoning tasks, so connection of the printer to a PC for error diffusion halftoning operations (as in the prior art) is not necessary. So the printer can operate as a stand-alone system, receiving images directly from devices such as digital cameras, digital camcorders, PDAs, etc., performing error diffusion halftoning operations, and generating real-time outputs to drive the printing device. This is shown generally in FIG. 12.

The above-described coprocessor embodiments can be used in many consumer products. For instance, HDTV and DVD users usually demand high quality video. The computational complexity for high resolution and fast frame rate video is very high. Application specific halftoning coprocessors can be embedded in a flat-panel display to produce high quality visual output.

Although exemplary embodiments of the invention have been described above in detail, this does not limit the scope of the invention, which can be practiced in a variety of embodiments.

What it claimed is:

1. An error diffusion halftoning apparatus, comprising:
    an input for receiving a sequence of pixels;
    a halftoner coupled to said input for performing a halftoning operation on each of said pixels;
    an error diffuser coupled to said halftoner for producing diffusion errors in response to quantization errors associated with said halftoning operations; and
    a controller coupled to said halftoner and said error diffuser for providing control signaling to said halftoner and said error diffuser, said error diffuser responsive to said control signaling for producing a set of diffusion errors associated with a previous halftoning operation while said halftoner is performing a current halftoning operation in response to said control signaling, wherein said halftoner and said error diffuser each include a plurality of execution stages, and wherein said control signaling is for controlling operation of said execution stages.

2. The apparatus of claim 1, wherein said halftoner and said error diffuser include respective data processing paths which both include an arithmetic calculation unit in common.

3. The apparatus of claim 2, including an accumulated error storage device coupled to said error diffuser, said error diffuser including a data processing path having an input coupled to said halftoner, said data processing path for producing said diffusion errors and for producing accumulated errors based on said diffusion errors, said data processing path having an output coupled to said error storage device for storing said accumulated errors in said accumulated error storage device, said data processing path including a diffusion error storage device coupled between said input and said output thereof for storing said diffusion errors, said data processing path for producing each of said accumulated errors based on one of said diffusion errors stored in said diffusion error storage device.

4. The apparatus of claim 3, wherein said error diffuser is further for producing accumulated errors based on said diffusion errors, said halftoner including a first combiner coupled to said input and said error diffuser for combining one of said accumulated errors with a current pixel to produce a combined result, and said halftoner including a second combiner coupled to said first combiner for combining said combined result with one of said diffusion errors.

5. The apparatus of claim 2, wherein said error diffuser is further for producing accumulated errors based on said diffusion errors, said halftoner including a first combiner coupled to said input and said error diffuser for combining one of said accumulated errors with a current pixel to produce a combined result, and said halftoner including a second combiner coupled to said first combiner for combining said combined result with one of said diffusion errors.

6. The apparatus of claim 1, including an accumulated error storage device coupled to said error diffuser, said error diffuser including a data processing path having an input coupled to said halftoner, said data processing path for producing said diffusion errors and for producing accumulated errors based on said diffusion errors, said data processing path having an output coupled to said error storage device for storing said accumulated errors in said accumulated error storage device, said data processing path including a diffusion error storage device coupled between said input and said output thereof for storing said diffusion errors, said data processing path for producing each of said accumulated errors based on one of said diffusion errors stored in said diffusion error storage device.

7. The apparatus of claim 6, wherein said error diffuser is further for producing accumulated errors based on said diffusion errors, said halftoner including a first combiner coupled to said input and said error diffuser for combining one of said accumulated errors with a current pixel to produce a combined result, and said halftoner including a second combiner coupled to said first combiner for combining said combined result with one of said diffusion errors.

8. The apparatus of claim 1, wherein said error diffuser is further for producing accumulated errors based on said diffusion errors, said halftoner including a first combiner coupled to said input and said error diffuser for combining one of said accumulated errors with a current pixel to produce a combined result, and said halftoner including a second combiner coupled to said first combiner for combining said combined result with one of said diffusion errors.

9. The apparatus of claim 1, wherein said input is for receiving a sequence of parallel-formatted pixel groups, each pixel of each said group corresponding to a respectively different color plane, said halftoner for performing halftoning operations in parallel on the pixels of each parallel-formatted pixel group, said halftoner for producing a parallel-formatted group of quantization errors in response to each said parallel-formatted pixel group, and said error diffuser for producing in response to said parallel-formatted group of quantization errors a corresponding parallel-formatted group of diffusion errors.

10. The apparatus of claim 1, wherein one of said execution stages of said halftoner and a corresponding one of said execution stages of said error diffuser are responsive to said control signaling for simultaneous operation.

11. The apparatus of claim 10, wherein all of said execution stages of said halftoner and said error diffuser are responsive to said control signaling for simultaneous operation.

12. The apparatus of claim 1, wherein said controller is for decoding a plurality of instructions in parallel, and wherein one of said execution stages is for performing a plurality of parallel operations which respectively correspond to said parallel-decoded instructions.

13. An error diffusion halftoning apparatus, comprising:
    an input for receiving a group of parallel-formatted pixels, each pixel of said group associated with a respectively different one of a plurality of color planes;
    a halftoner coupled to said input for performing in parallel respective halftoning operations on the respective pixels of said group; and
    an error diffuser having an input coupled to said halftoner for receiving therefrom a group of parallel-formatted quantization errors respectively associated with said halftoning operations, said error diffuser for producing, in parallel, and in response to said parallel-formatted group of quantization errors, a corresponding parallel-formatted group of diffusion errors.

14. The apparatus of claim 13, wherein said halftoner and said error diffuser each includes an execution stage that is operable in response to control signaling associated with a single input-multiple data (SIMD) instruction.

15. An error diffusion halftoning apparatus, comprising:
a first input for receiving a sequence of pixels;
a second input for receiving an accumulated error produced in response to one of said pixels in said sequence;
a first combiner coupled to said first and second inputs for combining a current pixel that follows said one pixel in said sequence with said accumulated error to produce a combined result;
a third input for receiving a diffusion error produced in response to one of said pixels that precedes said current pixel in said sequence; and
a second combiner coupled to said first combiner and said third input for combining said combined result with said diffusion error.

16. An error diffusion halftoning method, comprising:
receiving a group of parallel-formatted pixels, each pixel of said group associated with a respectively different one of a plurality of color planes;
performing, in parallel, respective halftoning operations on the respective pixels of said group;
receiving a group of parallel-formatted quantization errors respectively associated with said halftoning operations; and
producing, in parallel, and in response to said parallel-formatted group of quantization errors a corresponding parallel-formatted group of diffusion errors.

17. The method of claim 16, wherein one of said performing and said producing includes executing a single instruction-multiple data (SIMD) instruction.

* * * * *